US 9,021,488 B2

(12) United States Patent
Kim et al.

(10) Patent No.: US 9,021,488 B2
(45) Date of Patent: *Apr. 28, 2015

(54) DEVICE MANAGEMENT SCHEDULING BASED ON TRAP MECHANISM

(75) Inventors: Te-Hyun Kim, Gyeonggi-Do (KR); Pablo Hernandez, Paris (FR)

(73) Assignee: LG Electronics Inc., Seoul (KR)

(*) Notice: Subject to any disclaimer, the term of this patent is extended or adjusted under 35 U.S.C. 154(b) by 1042 days.

This patent is subject to a terminal disclaimer.

(21) Appl. No.: 11/657,095

(22) Filed: Jan. 24, 2007

(65) Prior Publication Data

US 2007/0174447 A1     Jul. 26, 2007

Related U.S. Application Data

(60) Provisional application No. 60/761,792, filed on Jan. 25, 2006, provisional application No. 60/762,517, filed on Jan. 27, 2006.

(30) Foreign Application Priority Data

May 12, 2006   (KR) .................. 10-2006-0043154
Jan. 18, 2007   (KR) .................. 10-2007-0005820

(51) Int. Cl.
*G06F 9/46*      (2006.01)
*H04L 12/24*    (2006.01)

(52) U.S. Cl.
CPC .................. *H04L 41/0681* (2013.01)

(58) Field of Classification Search
USPC ................. 709/201, 202, 203; 718/100
See application file for complete search history.

(56) References Cited

U.S. PATENT DOCUMENTS

| | | | |
|---|---|---|---|
| 5,063,523 A | 11/1991 | Vrenjak | |
| 5,913,037 A | 6/1999 | Spofford et al. | |
| 6,125,388 A * | 9/2000 | Reisman | 709/218 |
| 6,175,832 B1 * | 1/2001 | Luzzi et al. | 1/1 |
| 6,182,157 B1 | 1/2001 | Schlener et al. | |
| 6,263,358 B1 | 7/2001 | Lee et al. | |
| 6,426,959 B1 | 7/2002 | Jacobson et al. | |
| 6,480,972 B1 | 11/2002 | Cromer et al. | |
| 6,664,978 B1 | 12/2003 | Kekic et al. | |
| 6,757,897 B1 | 6/2004 | Shi et al. | |

(Continued)

FOREIGN PATENT DOCUMENTS

| | | |
|---|---|---|
| CN | 1543251 A | 11/2004 |
| EP | 1170664 A2 | 1/2002 |

(Continued)

OTHER PUBLICATIONS

Li, "Agent-Based Mobile Multimedia Service Quality Monitoring", MMNS 2004, LNCS 3271, pp. 189-199, 2004.

*Primary Examiner* — Meng An
*Assistant Examiner* — James J Lee
(74) *Attorney, Agent, or Firm* — Birch, Stewart, Kolasch & Birch, LLP

(57) ABSTRACT

Performing device management scheduling based upon a trap mechanism is provided. A scheduling context, upon receipt from a server, is installed. The scheduling context may have at least one of a first element specifying information including at least one command for device management and a second element specifying a trap-based condition to execute the command. The command in the message specified by the first element is executed, if an occurrence of a particular event specified by the second element is found.

3 Claims, 8 Drawing Sheets

(56) References Cited

U.S. PATENT DOCUMENTS

| | | |
|---|---|---|
| 6,788,429 B1 | 9/2004 | Clough et al. |
| 6,950,864 B1 | 9/2005 | Tsuchiya |
| 6,970,917 B1 * | 11/2005 | Kushwaha et al. ........... 709/217 |
| 6,970,923 B1 | 11/2005 | Mukaiyama et al. |
| 6,978,302 B1 | 12/2005 | Chisholm et al. |
| 7,493,407 B2 | 2/2009 | Leedom et al. |
| 7,499,700 B2 | 3/2009 | Dillon et al. |
| 7,523,155 B2 | 4/2009 | Hayes, Jr. |
| 7,716,276 B1 | 5/2010 | Ren et al. |
| 7,739,368 B2 | 6/2010 | Kim |
| 7,752,296 B2 | 7/2010 | Kim |
| 7,827,560 B2 | 11/2010 | Bayer |
| 7,877,634 B2 | 1/2011 | Kawano |
| 7,925,740 B2 * | 4/2011 | Nath et al. ................... 709/224 |
| 7,949,730 B2 | 5/2011 | Rensin et al. |
| 7,966,365 B2 | 6/2011 | Hernandez |
| 7,987,463 B2 | 7/2011 | Kim et al. |
| 8,001,231 B2 | 8/2011 | He |
| 8,073,960 B2 * | 12/2011 | Hallamaa et al. ............. 709/229 |
| 8,104,037 B2 | 1/2012 | Kim et al. |
| 8,209,676 B2 | 6/2012 | Kapadekar et al. |
| 2002/0152105 A1 | 10/2002 | Dan et al. |
| 2003/0187982 A1 | 10/2003 | Petit |
| 2003/0204640 A1 | 10/2003 | Sahinoja et al. |
| 2003/0236823 A1 | 12/2003 | Patzer et al. |
| 2004/0030533 A1 | 2/2004 | Hirose et al. |
| 2004/0172469 A1 | 9/2004 | Takahashi et al. |
| 2004/0204978 A1 | 10/2004 | Rayrole |
| 2004/0252197 A1 | 12/2004 | Fraley et al. |
| 2005/0060361 A1 | 3/2005 | Chatrath et al. |
| 2005/0216222 A1 | 9/2005 | Inoue |
| 2005/0289229 A1 * | 12/2005 | Kim ............................. 709/223 |
| 2006/0015626 A1 | 1/2006 | Hallamaa et al. |
| 2006/0041652 A1 | 2/2006 | Cowham |
| 2006/0112416 A1 | 5/2006 | Ohta et al. |
| 2006/0190608 A1 | 8/2006 | Sahinoja et al. |
| 2006/0212562 A1 * | 9/2006 | Kushwaha et al. ........... 709/223 |
| 2006/0217113 A1 * | 9/2006 | Rao et al. .................... 455/422.1 |
| 2006/0221848 A1 | 10/2006 | Lake |
| 2006/0271659 A1 | 11/2006 | Mittal et al. |
| 2007/0011681 A1 | 1/2007 | Shu et al. |
| 2007/0030539 A1 * | 2/2007 | Nath et al. .................... 358/520 |
| 2007/0106770 A1 | 5/2007 | Alnas |
| 2007/0168728 A1 | 7/2007 | Blouin et al. |
| 2007/0174716 A1 | 7/2007 | Erdtmann et al. |
| 2007/0265003 A1 | 11/2007 | Kezys et al. |
| 2009/0013220 A1 | 1/2009 | Kawano |
| 2010/0251249 A1 | 9/2010 | Kim |

FOREIGN PATENT DOCUMENTS

| | | |
|---|---|---|
| JP | 11-39165 A | 2/1999 |
| JP | 2002-216279 A | 8/2002 |
| JP | 2004-302748 A | 10/2004 |
| JP | 2005-149423 A | 6/2005 |
| JP | 2005-234736 A | 9/2005 |
| KR | 2005-0046932 A | 5/2005 |
| KR | 10-2005-0117936 A | 12/2005 |
| WO | WO 00/38033 A2 | 6/2000 |
| WO | WO 2005/004395 A1 | 1/2005 |
| WO | WO 2005/121989 A1 | 12/2005 |
| WO | WO-2006/006803 A1 | 1/2006 |

\* cited by examiner

FIG. 2

```
<DMSched>
   <Condition>
      <Trap>
         <TrapRef>3421</TrapRef> <!-- Trap ID -->
      </Trap>
      <Timer>
         <Base>18:20 </Base>
         <RRule>On</RRule>
      </Timer>
   </Condition>
   <Task>
   <!-- Management Tasks to be executed when Trap 3421 occurs -->
   </Task>
</DMSched>
```

DEVICE MANAGEMENT SCHEDULING BASED ON TRAP MECHANISM

This Non-provisional application claims priority under 35 U.S.C. §119(e) on Provisional Application Nos. 60/761,792 and 60/762,517 filed on Jan. 25, 2006 and Jan. 27, 2006, respectively and under 35 U.S.C. §119(a) on Patent Application Nos. 10-2006-0043154 and 10-2007-0005820 filed in Republic of Korea on May 12, 2006 and Jan. 18, 2007, respectively, the entire contents of which are hereby incorporated by reference.

The present disclosure relates to device management scheduling based on a trap mechanism.

In general, device management (DM) technology relates to showing (or indicating), to a device management (DM) server (or other network entity), the resources of a device management (DM) client (i.e., a terminal or other user device) as management objects that exist on a device management (DM) tree (or other type of hierarchy structure or logical format that is used for device management), allowing access thereto, and letting the DM server easily manage the terminal.

In such DM technology, the DM server may instruct the terminal to process commands for device management, while the terminal being managed, after immediately performing the corresponding command, may report the results thereof to the DM server. Also, the DM server may request the terminal to change, update, delete or otherwise process a particular function for device management.

One aspect of this disclosure is the recognition by the present inventors of the following drawbacks in certain DM techniques. Namely, in some DM techniques, the terminal may request the DM server for DM commands only when there is an error or malfunction within the terminal. As such, the diagnostic procedures of the terminal become more expensive, and do not allow effective resolution of diagnostic problems because such problems cannot be anticipated or discovered before they occur.

Thus, in order to address the above drawbacks, this disclosure provides a terminal capable of performing device management scheduling based on a trap mechanism.

The accompanying Figures show various features of an exemplary embodiment(s) according to the invention, wherein:

FIG. 2 shows an exemplary DM schedule;

Figure 1:
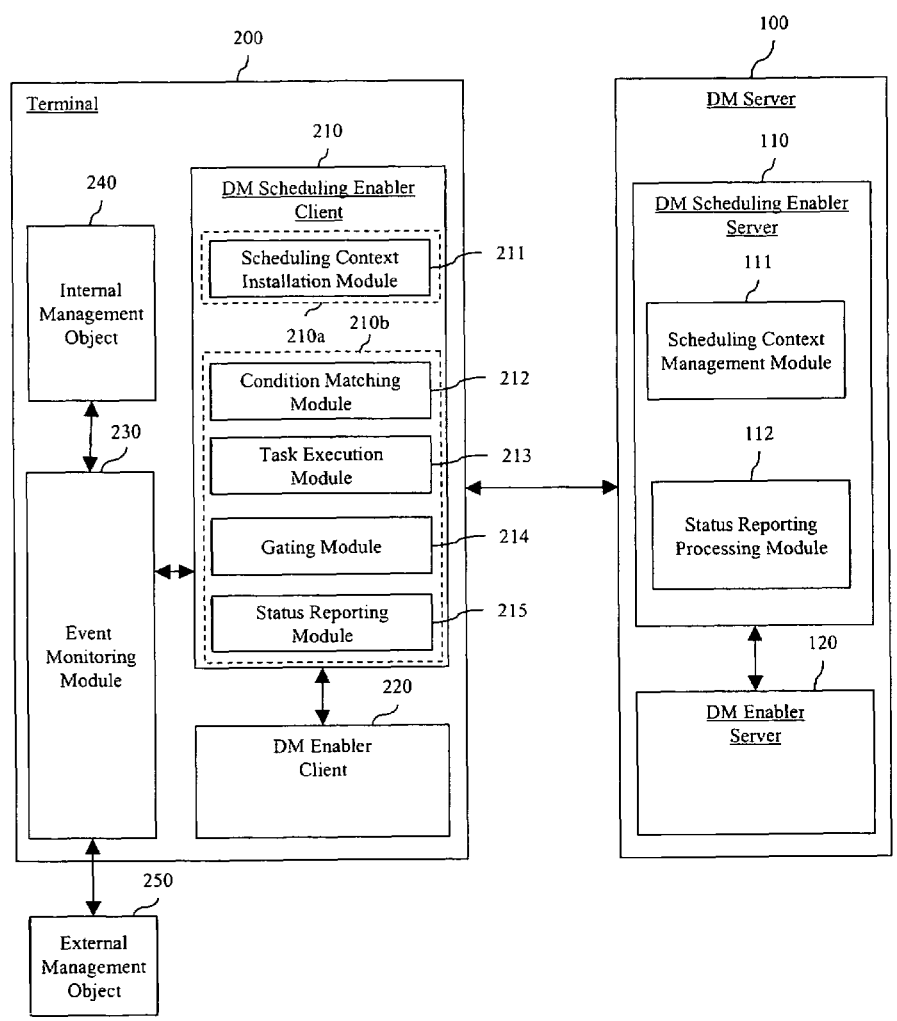
FIG. 1 shows a device management (DM) terminal and a device management (DM) server.

As shown in FIG. 1, a DM system according to an exemplary embodiment(s) invention may include a DM server 100 and a terminal 200. It can be understood that other types of servers, network entities, or the like may be implemented. The terminal may be a user device, user equipment (UE), a mobile terminal, a client device, or the like.

The DM server 100 may comprise a DM scheduling enabler server 110 (comprising hardware, software, or any combination thereof) and DM enabler server 120 (comprising hardware, software, or any combination thereof). It can be understood that additional and/or alternative entities and elements may exist within the DM server 100.

The DM scheduling enabler server 110 may comprise a scheduling context management module 111 (comprising hardware, software, or any combination thereof) and a status reporting processing module 112 (comprising hardware, software, or any combination thereof). It can be understood that additional and/or alternative entities and elements may exist within the DM scheduling enabler server 110.

The scheduling context management module 111 can generate a scheduling context (i.e., an outline, basis, framework, etc. used in performing device management scheduling) and request the terminal 200 to install the same.

As shown in FIG. 2, the scheduling context may include at least one task element (e.g., a first element) which specifies information (or, a message) including at least one command (or instructions) for device management, and a condition element (e.g., a second element) which specifies a condition (a factor, circumstance, etc.). The condition element may include a trap item (or trap mechanism), which specifies a particular event (incident, occasion, trigger, etc.) so that the terminal 200 can execute the command in the information (or, message) specified by the first element if the particular event specified by the trap item occurs.

Here, the term "trap" (as used in a trap item, a trap mechanism, etc.) can be understood by those skilled in the art as referring to a certain type of condition-based scheme that allows hardware, software (i.e., operating system), or their combination to operate a in certain way if triggered (or set off).

The condition element may further include a timer item (or some other element that indicates a timer-like function), which specifies a particular point in time so that the terminal 200 can execute the command in the information (or, message) specified by the first element, if an arrival at the particular point in time is found (detected). Here, the condition element may further include a base item which specifies the particular point in time which can be expressed in full representation. And, the condition element further includes a recursive rule item which specifies whether the point in time is recursive or not.

Also, the condition element may further include a threshold item (or some other element that indicates a threshold value), which specifies a threshold (value) so that the terminal 200 can execute the command in the information (or, message) specified by the first element if a value of a particular management object in the terminal 200 crosses the threshold (value).

Figure 3:
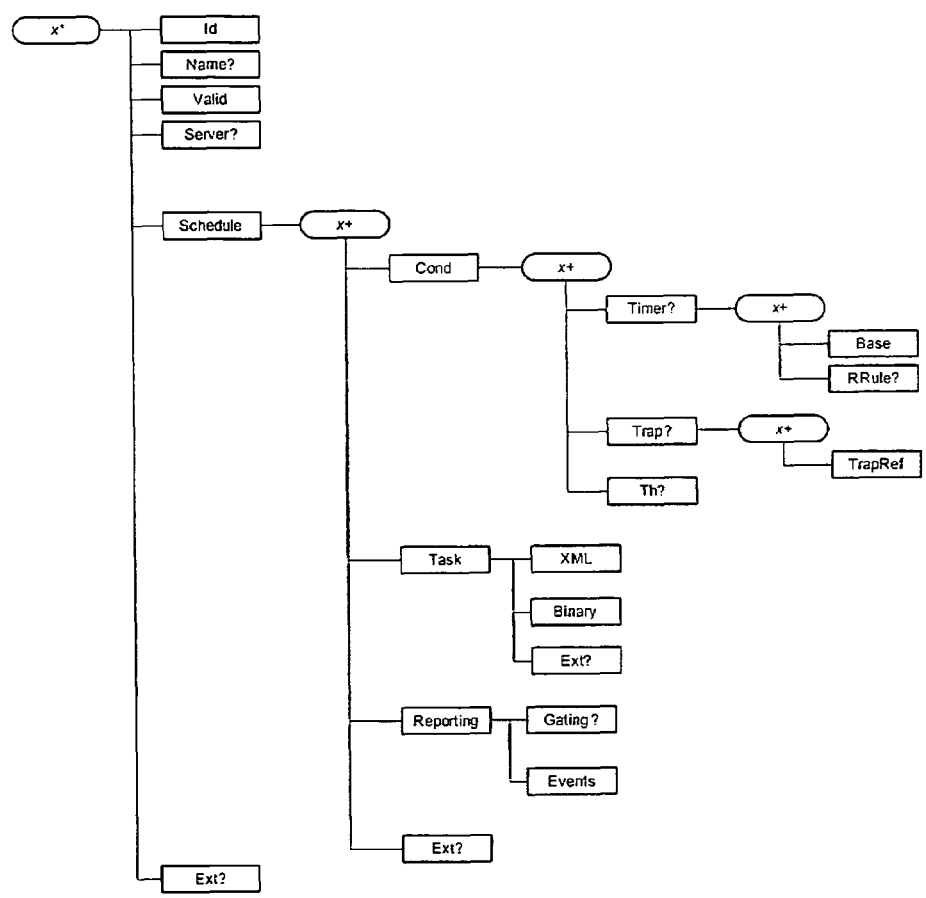
FIG. 3 shows the scheduling context as one exemplary tree structure.

Furthermore, the scheduling context may further comprise additional information as illustrated in FIG. 3, which will be explained is more detail later.

The scheduling context management module 111 can establish a DM session with the terminal 200 and request the terminal 200 to install the generated scheduling context through the established DM session.

The status reporting processing module 120 may receive a state report, for example, a result from executing the command from the terminal 200 and processes the same.

The DM enabler server 120 may set a session with the terminal 200 and then request the terminal 200 to perform device management, but not through scheduling context.

An exemplary terminal 200, scheduling context and the overall operation according to various exemplary embodiments will be described under separate sections labeled with appropriate sub-headings hereafter.

Terminal 200

As shown, the terminal 200 may include a DM scheduling enabler client 210, a DM enabler client 220, an event monitoring module 230, an internal management object 240, and an external management object 250. It can be understood that additional and/or alternative entities and elements may exist within the terminal 200.

The DM scheduling enabler client 210 may include a first entity 210a which install, upon receipt from the server 100, the scheduling context, and a second entity 210b which executes the command for device management. It can be understood that additional and/or alternative entities and elements may exist within the DM scheduling enabler client 210.

The first entity 210a may include a scheduling context installation module 211. The scheduling context installation module 211 processes the scheduling context installation request of the DM server 100. Namely, the scheduling context installation module 211 may install the scheduling context in the form of a DM tree (or other type of hierarchy structure or logical format that is used for device management).

Herein, if the second element specifies the trap-based condition, the scheduling context installation module 211 may perform a supplementary procedure in order to process the scheduling context installation request. Specifically, the scheduling context installation module 211 requests the event monitoring module 230 to notify when the internal or external management object 240 or 250 generates the particular event.

The scheduling context installation module 211 can selectively verify the validity of the scheduling context before installation thereof.

The second entity 210b may include a condition matching module 212, a task execution module 213, a gating module 214, and a status reporting module 215. It can be understood that additional and/or alternative entities and elements may exist within the second entity 210b.

The condition matching module 212 can monitor whether the condition is matched, and if so, the condition matching module 212 can request the task execution module 213 to perform the command corresponding to the condition.

If the condition corresponds to the trap-based condition, the condition matching module 212 can monitor whether the particular event has occurred through the event monitoring module 230. For example, when the condition is related to a particular event having an ID of 3421 indicated in the TrapRef item as shown in FIG. 2, the condition matching module 212 monitors whether the particular event of the ID of 3421 has occurred through the event monitoring module 230.

The task execution module 213 may cooperate with the DM enabler client module 220 so that the command can be executed, when the condition to execute the command is determined to be matched.

The gating module 214 may determine whether to report a result from executing the command to the DM server 100. The gating module 214 can determine whether to report the result based on a gating rule which as explained below can be included in the scheduling context.

The status reporting module 215 may report one or more states (or status) of the scheduling context in the terminal 200 and the result(s) from executing the command to the DM server 100. The status reporting module 215 creates a report message (or some other type of report indication) by using one or more of the results and the status of the scheduling context, and then transmits the report message to the DM server 100.

The DM enabler client module 220 may execute the command for device management by cooperating with the command execution module 213. In detail, the DM enabler client module 220 may receive the command from the command execution module 213, executes the command, and then returns a result from executing the command to the command execution module 213.

The event monitoring module 230 may be electrically connected with the internal or external management object 240 or 250, and processes and manages an event generated from the internal or external management object 240 or 250. In detail, the event monitoring module 230 may request the internal or external management object 240 or 250 to notify whenever the particular event occurs, and when the event monitoring module 230 receives a corresponding notification, it can process the notification. In addition, when the event monitoring module 230 receives the notification, it can inform the condition matching module 212 or the server 100 about whether the event has occurred or not. The event monitoring module 230 may be constructed to be separated from the DM scheduling enabler client 210 in FIG. 1, but it can also be embedded into the DM scheduling enabler client 210.

The internal or external management object 240 or 250 may include one or more electronic components inside or outside the terminal 200, as well as a driver for driving the electronic components and an application software module. When a particular event occurs, the internal or external management object 240 or 250 can provide relevant data together with the event to the event monitoring module 230 according to a request of the event monitoring module 230.

As stated above, the DM server 100 may include the DM scheduling enabler 110 and the DM enabler 120, and the terminal 200 may include the DM scheduling enabler client 210, the DM enabler client 220, the event monitoring module 230 and the internal or external management object 240 and 250. However, the server 100 or the terminal 200 may be constructed by combining a processor (not shown), a network interface (not shown), and a storage means (not shown) with one another. Here, it can be understood that other similar hardware, software, or any combination thereof may also be used.

Scheduling Context

FIG. 3 is a view showing the scheduling context as one exemplary tree structure (with nodes or other types of points, placeholders, etc. in a hierarchy structure). As shown, the scheduling context may include a general part and at least one schedule component.

The general part may include an ID node for representing an identifier of the scheduling context, a Name node for representing a name of the scheduling context, a Valid node for specifying a valid period of the scheduling context, and a Server node for representing an owner of the scheduling context. Clearly, other types of additional or alternative nodes are possible.

The schedule component may include one or more of a task node (i.e., a first node) for specifying information (or, message) including at least one command for device management, a condition node (i.e., a second node) for specifying a condition to execute the command, a gating node (i.e., a third node) for specifying whether or not a result from executing the command should be reported to the server, and an event node (i.e., a fourth node) for specifying whether or not the result and a status of the scheduling context should be reported to the server.

The condition node may include at least one of a timer node for specifying a timer-based condition, a trap node for specifying a trap-based condition, and a threshold node for specifying a threshold-based condition, i.e. whether a value of a particular management object in the terminal has reached a threshold value.

First, the trap node may include a trap reference node (or TrapRef node, or identifier) for specifying an identifier of a particular event.

And, the timer node may specify one of a given point in time, a duration, a period, and an interval. Such timer node may include a base node for specifying point in time expressed in complete representation, and a recurrence rule (RRule) node for specifying whether the condition is recursive or not. Therefore, if a recurrence is not specified in recurrence rule node, the timer-based condition may be disabled after the command is executed once.

The task node can include a XML node specifying whether the information (or, message) including a command with XML-based (Extensible Markup Language) data, and a Binary node specifying whether the information (or, message) including the command binary-based data.

Figure 4:
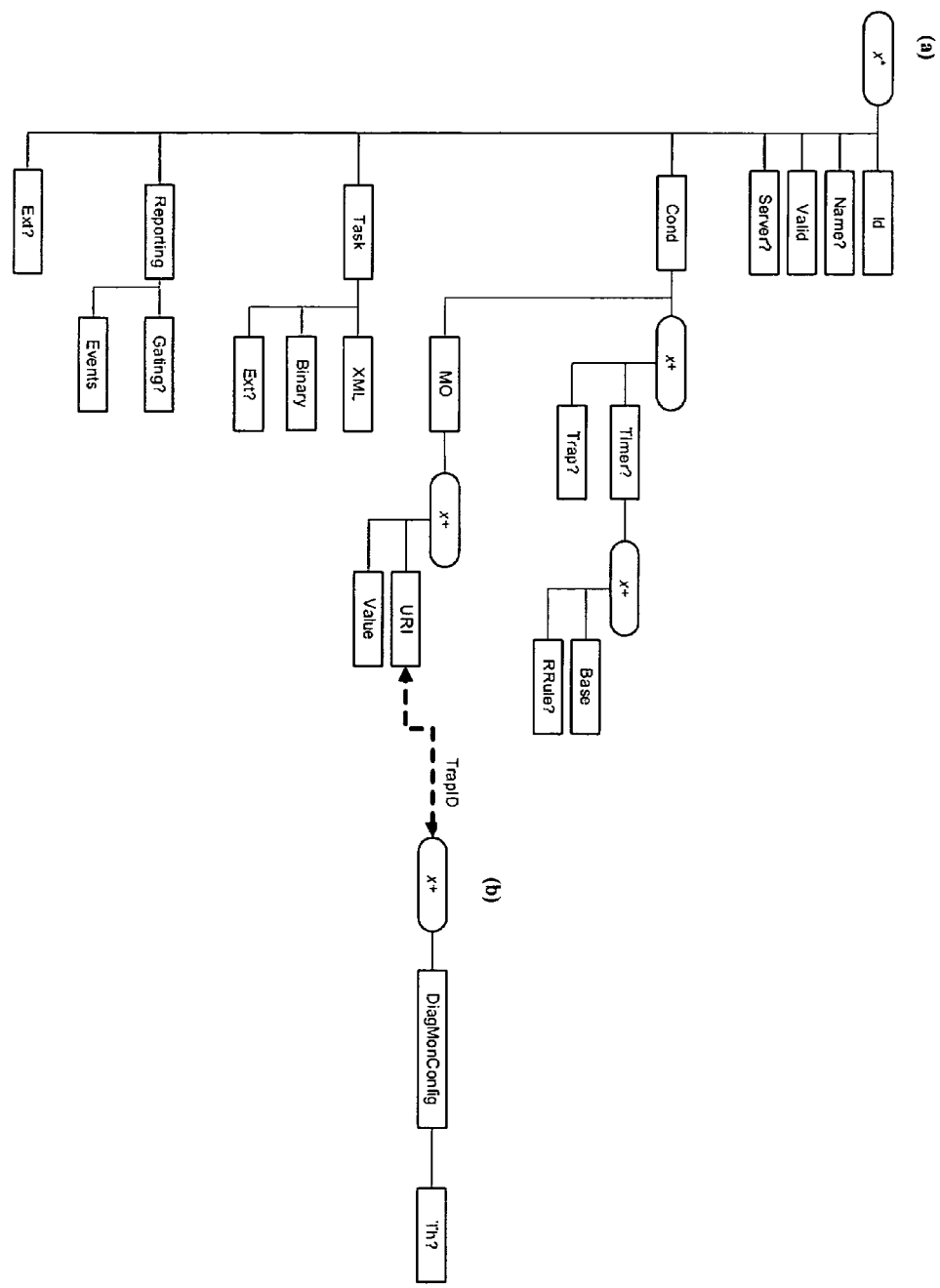
FIG. 4 shows the scheduling context as other exemplary tree structure.

FIG. 4 is a view showing the scheduling context as other exemplary tree structure. As shown, the threshold node is apart from the scheduling context, and the threshold node is included with a separated management object. Also, the task node, the condition node, the user interaction node, the gating node, and the event node are directly included in the scheduling context, but not the schedule component. However, it is clear that other implementation of these nodes (or additional and/or alternative nodes) are also possible.

As illustrated in FIG. 4(a), the condition node of the scheduling context may include a timer node, and a trap node. And the condition node may further include a management node (or, MO node) which indicates a particular management object in the terminal 200. The management object node may include at least one of a URI node which indicates an uniform resource identifier of the particular management object, and a value node which specifies a value for additionally identifying whether the particular management object indicated by the URI node is intended. However, it is clear that other implementation of these nodes (or additional and/or alternative nodes) are also possible.

As illustrated in FIG. 4(b), the separated management object may include a diagnose monitoring configuration node (or, DiagMonConfig node). The diagnose monitoring configuration node may include the threshold node as explained above.

Hereinafter, the scheduling context and the separated management object as explained above will be further explained by some examples. If a value of any management object crosses the threshold indicated by the threshold node of the diagnose monitoring configuration node, an event occurs. Then, it is checked whether the any management object which has occurred the event corresponds to the particular management object indicated the URI node of the management object node in the scheduling context. If the any management object corresponds to it, it is further checked whether the occurred event corresponds to an event indicated by the trap node of the scheduling context. If the occurred event corresponds to it, the condition matching module 212 determines that the condition is satisfied, and then the task execution module 213 executes the command.

Figure 5:
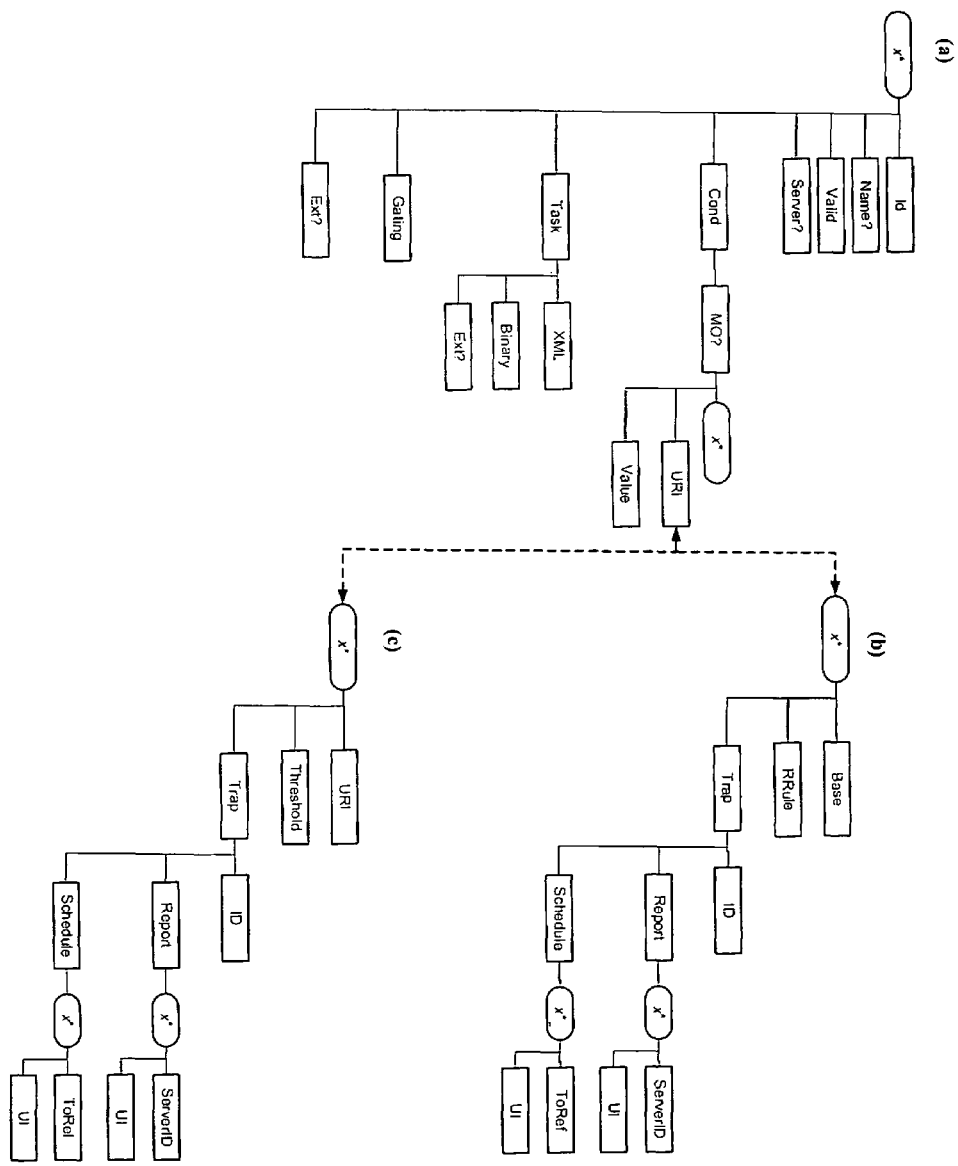
FIG. 5 shows the scheduling context as another exemplary tree structure.

FIG. 5 is a view the scheduling context as another exemplary tree structure. As shown, a timer node and a threshold node are apart from (separated) a scheduling context, and are included in a separated management object. And, a trap node is included in each of the timer node and the threshold node.

As illustrated in FIG. 5(a), a condition node of a scheduling context includes only a management object. The management object node may include at least one of a URI node which indicates an uniform resource identifier of the particular management object, and a value node which specifies a value for additionally identifying whether the particular management object indicated by the URI node is intended.

As illustrated in FIG. 5(b), a timer schedule management object including the timer node (which is apart from the scheduling context) may include at least one of a base node specifying a particular point in time to execute a command for device management, a recursive rule node (or, RRule node) specifying whether the particular point should recursively be used, and a trap node. The trap node may include at least one on an identifier node (or, ID node) specifying an identifier of a particular event which will occur if it arrives at the particular point, a report node, and a schedule node. Herein, the report node includes at least one of server identifier node (or, ServerID node) specifying an identifier of a server to which the particular event will be reported if the particular event occurs, and a user interaction node specifying whether to interact with user with respect to the occurrence of the particular event. The schedule node includes at least one of an user interaction node specifying whether to interact with user, and a reference node (or, ToRef node, or identifier) specifying an identifier of the scheduling context.

As illustrated in FIG. 5(c), a threshold monitoring management object including a threshold node (which is apart from the scheduling context) may include at least one of a uniform resource identifier node (or, URI node) specifying an identifier of a particular management object to be monitored, and a threshold node specifying a threshold of the particular management object to be monitored, and a trap node.

Hereinafter, the scheduling context and the time schedule management object as explained above will be further explained by some examples. If it is found that the point in time indicated in the base node has arrived, an event occurs. Then, it is checked whether an identifier of the occurred event corresponds to the identifier specified in the identifier node of the trap node. If the identifier of the occurred event corresponds to it, the terminal 200 reports the server according to the server identifier node of the report node. And, the occurred event is delivered to the scheduling context specified by the ToRef node. Then, the terminal 200 executes a command for device management specified in a task node of the scheduling context.

Also, the scheduling context and the threshold monitoring management object as explained above will be further explained by some examples. If a value of the particular management object specified by the URI node crosses the threshold specified by the threshold node, an event occurs. And, it is checked whether an identifier of the occurred event corresponds to the identifier specified by the ID node of the trap node. If the identifier of the occurred event corresponds to it, the terminal 200 reports the server according to the server identifier node of the report node. And, the occurred event is delivered to the scheduling context specified by the ToRef node. Then, the terminal 200 executes a command for device management specified in a task node of the scheduling context.

Operation

The operation of the terminal and DM server according to the exemplary embodiment(s) will now be described in detail with reference to FIGS. 6 to 8. Although FIG. 6 to FIG. 8 do not show all elements in detail, it should be considered that each operation is performed by various corresponding elements of the DM server 100 and the terminal 200.

Figure 6:
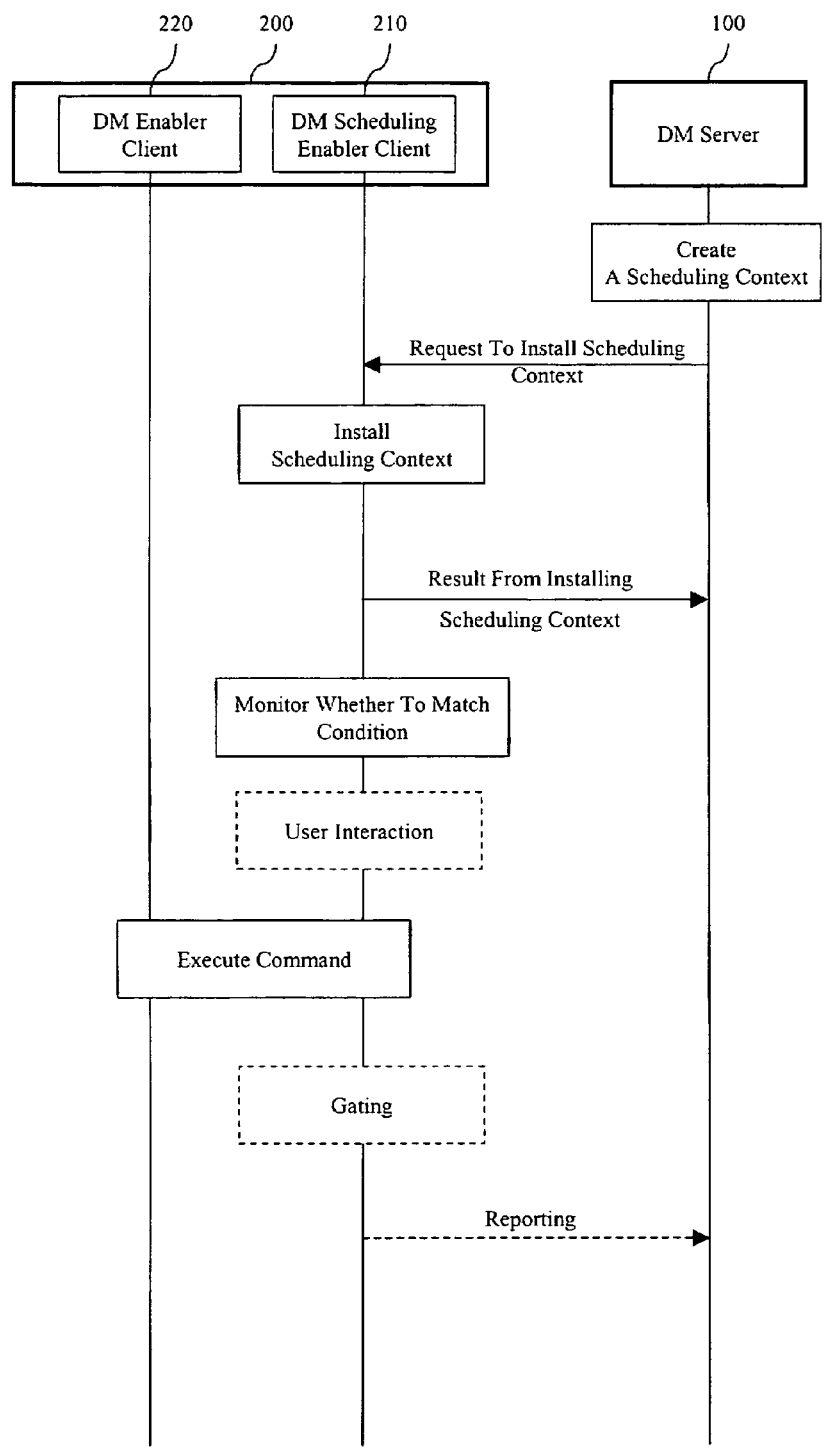
FIG. 6 shows a flow chart of an exemplary device management scheduling method.

FIG. 6 is a flow chart of one example of a device management scheduling method. As shown, the DM server 100 provides a command for device management to be executed in the terminal 200 and a condition to execute the command to the terminal 200. Then, the terminal 200 executes the command if it is determined that the condition is matched. Accordingly, the terminal 200 recognizes that the DM server 100 immediately provides the command for device management, whenever the terminal 200 requires the command.

1) The DM server 100, more specifically, the scheduling context management module 111 creates a scheduling context.

2) The DM server 100 sets (establishes) a DM session with the DM enabler scheduling enabler client 210 of the terminal 200, and requests an installation of the created scheduling context to the DM scheduling enabler client 210 of the terminal 200.

3) Then, the DM scheduling enabler client 210 of the terminal 200, more specifically, the scheduling context installation module 211 installs the scheduling context in a DM tree of the terminal 200.

4) When the installation is completed, the DM scheduling enabler client 210 of the terminal 200 reports a result of the installation of the scheduling context to the DM server 100.

5) The DM scheduling enabler client 210, more specifically, the condition matching module 212 checks a condition based on the condition node in the DM tree, and monitors whether the condition matching is detected. As aforementioned, the condition may be one of a timer-based condition, a trap-based condition, and a threshold-based condition.

6) When the condition matching is detected, the DM scheduling enabler client 210, more specifically, the DM scheduling enabler client 210, more specifically, the command execution module 213 executes the command by cooperating with the DM enabler client 220.

7) When the execution of the command is completed, the DM scheduling enabler client 210, more specifically, the gating module 214 gates a result of the execution. As aforementioned, the gating may be performed according to the gating node in the DM tree.

8) The DM scheduling enabler client 210, more specifically, the reporting module 215 reports a result of the execution having not been gated-off or a status of the terminal 200 to the DM server 100. That is, the reporting module 215 reports to the DM server 100 whether or not the command has been successfully executed, or reports a cause(s) of an error occurrence. For the reporting, the reporting module 216 creates a reporting message (or the like) by using the result of the execution, and then sends it to the DM server 100.

9) The DM server 100, having received the status report, parses (or further processes) it.

Figure 7:
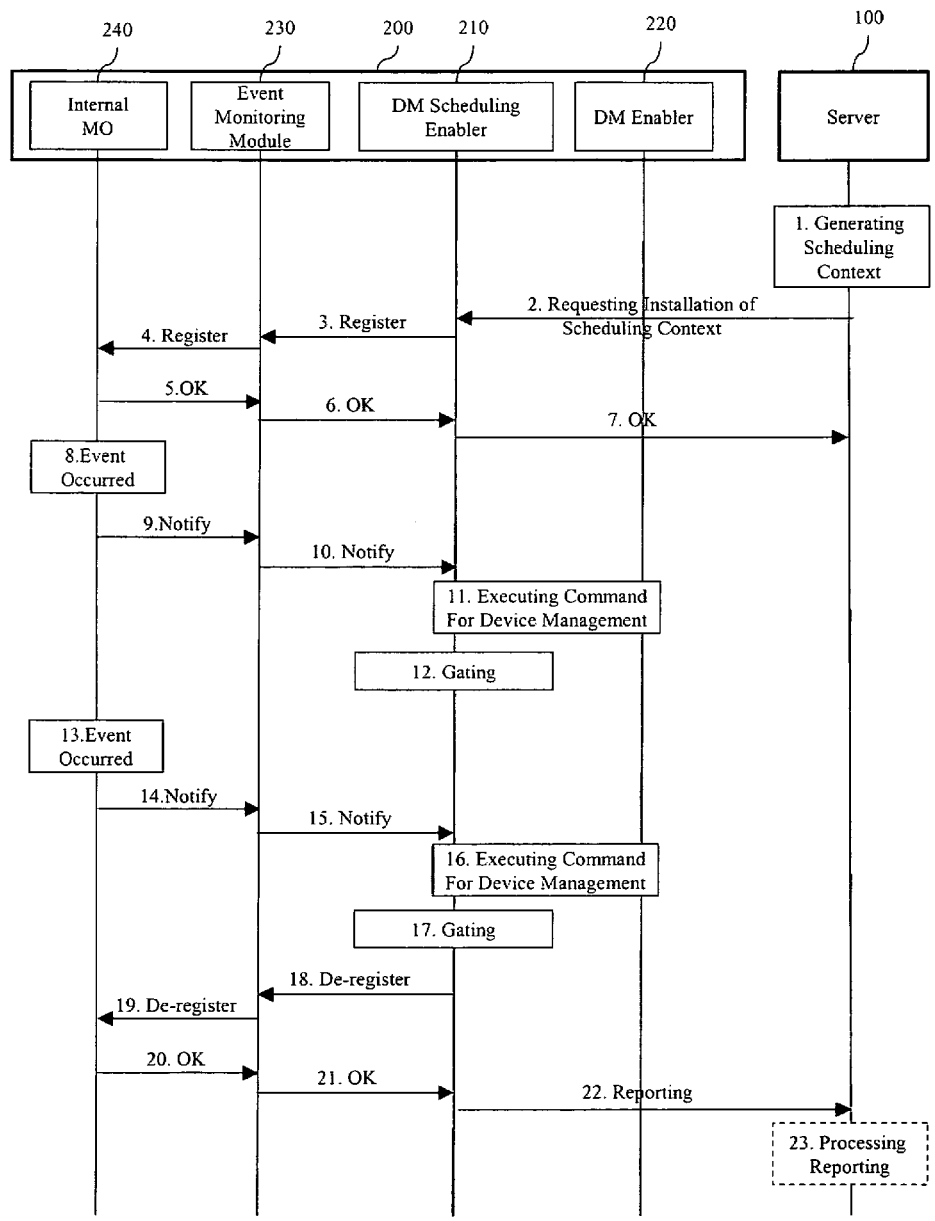
FIG. 7 shows a flow chart of another example of a DM scheduling method.

FIG. 7 is a flow chart of one example of a DM scheduling method. Specifically, FIG. 7 shows a DM scheduling method for repeatedly executing commands according to whether or not a particular event occurs in the internal management object 240.

Each procedure of such process is as follows.

1) First, the DM server 100 (specifically, the scheduling context management module 111) generates a scheduling context.

2) The DM server 100 requests the terminal to install the generated DM scheduling context by using a DM protocol.

3) Then, the DM scheduling enabler client 210 (specifically, the scheduling context installation module 211) of the terminal 200 processes the installation request. Subsequently, the DM scheduling enabler client 210 requests the event monitoring module 230 to notify when the particular event occurs. In this case, the request can be transferred through a register message.

4) In response to the request, the event monitoring module 230 requests the internal management object 240 to notify when the particular event occurs. In this case, the request can be transferred through the register message as mentioned above.

5) In response to the request, the internal management object 240 transfers an ACK message to the event monitoring module 230.

6) Upon receiving the ACK message, the event monitoring module 230 transfers the ACK message to the DM scheduling enabler client 210.

7) When the installation is completed through the above-described process, the DM server 100 receives a report on the processing result of the installation of the scheduling context.

8) Thereafter, the internal management object 240 ascertains that the particular event has occurred.

9) Then, the internal management object 240 informs the event monitoring module 230 about the occurrence of the particular event.

10) The event monitoring module 230 informs the DM scheduling enabler client 210 about the generation of the event.

11) Then, the DM scheduling enabler 210 (specifically the condition matching module 212) determines that the performing conditions were matched. Then, the DM scheduling enabler client 210 (specifically, the task execution module 213) executes the command.

12) When executing of the command is completed, the DM scheduling enabler client 210 (specifically the gating module 214) determines whether to report a result from executing the command to the DM server 100 and stores the result.

13) Thereafter, the internal management object 240 ascertains again that the particular event has occurred.

14~17) Then, the event monitoring module 230 is informed the occurrence of the particular event in the same manner as mentioned above, and the command is also executed. Subsequently, whether to report a result from executing the command is determined and the result is stored in the same manner as described above.

18) The command is repeatedly performed according to occurrence of the particular event, and when the use of the condition expires, the DM scheduling enabler client 210 requests the event monitoring module 16 to release notification for the occurrence of the particular event. In this case, the notification release request can be performed through a de-register message.

19) In response to the release request, the event monitoring module 230 requests the internal management object 240 to release the notification with respect to the particular event.

20) In response to the release request, the internal management object 240 transfers the ACK message to the DM scheduling enabler client 210.

21) Upon receiving the ACK message, the event monitoring module 230 transfers the ACK message to the DM scheduling enabler client 210.

22) Thereafter, the DM scheduling enabler client 210 (specifically, the status reporting module 215) reports the results, which have been stored upon being determined to be reported to the server 100 and the state of the scheduling context, to the server 100.

23) Upon receiving the report on the state, the DM server 100 parses the received report and processes it.

Figure 8:
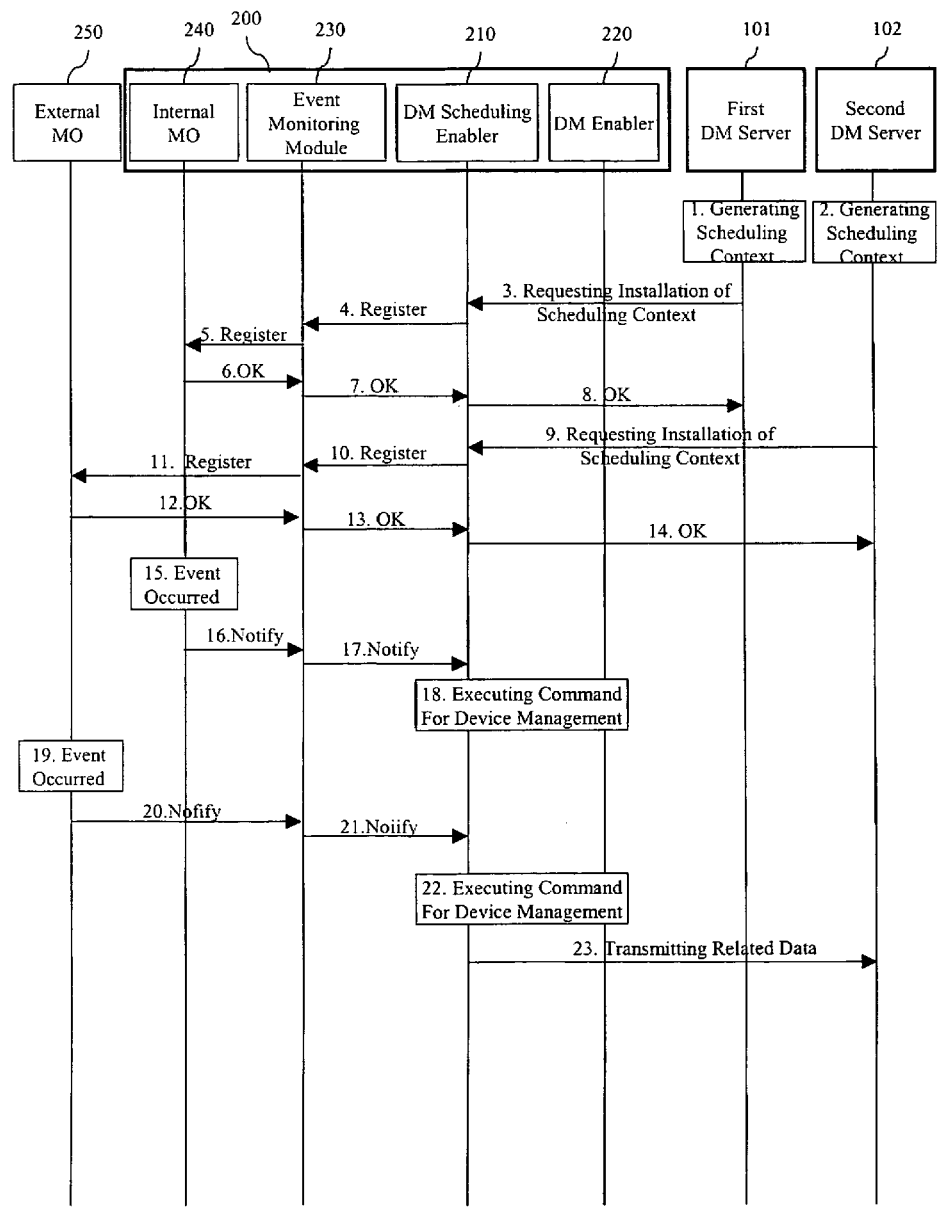
FIG. 8 shows a flow chart of yet another example of the DM scheduling method.

FIG. 8 is a flow chart of another example of the DM scheduling method, which shows a situation where the first server 101 requests the terminal 200 to execute a command according to a particular event generated from the internal management object 240 of the terminal 200, and the second server 202 requests the terminal 200 to execute a command according to a particular event generated from the external management object 250 of the terminal 200.

1) First, the first server 101 generates a scheduling context. Here, the scheduling context may include a command and a condition used for executing the command according to whether a particular event occurs or not in the internal management object 240 of the terminal 200.

2) The second server 102 generates a scheduling context. Here, the scheduling context may include a command and a condition used for executing a command according to whether a particular event has occurred or not in the external management object 250 of the terminal 200.

3) The first server 101 requests the terminal 200 to install the generated DM scheduling context by using a DM protocol.

4) Then, the DM scheduling enabler client 210 (specifically, the scheduling context installation module 211) of the terminal 200 processes the installation request. Subsequently, the DM scheduling enabler client 210 requests the event monitoring module 230 to notify when the particular event occurs.

5) In response to the request, the event monitoring module 230 requests the internal management object 240 to notify when the particular event occurs.

6) In response to the request, the internal management object 240 transfers an ACK message to the event monitoring module 230.

7) Upon receiving the ACK message, the event monitoring module 230 transfers the ACK message to the DM scheduling enabler client 210.

8) When the installation is completed through the above processes, the first server 101 is reported on the processing results of the installation of the scheduling context.

9) Meanwhile, the second server 102 also requests the terminal 200 to install the generated DM scheduling context by using the DM protocol.

10)~14) Then, the event monitoring module 230 starts monitoring whether the particular event has occurred or not in the same manner as in the processes 4) to 8) above, and the second server 102 receives a report about the processing results of the installation of the scheduling context.

15) Thereafter, the internal management object 240 ascertains that the particular event has occurred.

16) Then, the internal management object 240 notifies the event monitoring module 230 about the occurrence of the particular event.

17) The event monitoring module 230 notifies the DM scheduling enabler client 210 about the occurrence of the event. Then, the DM scheduling enabler client 210 (specifically, the condition matching module 212) determines that the condition has been matched.

18) Then, the DM scheduling enabler client 210 (specifically the task execution module 213) executes the command for device management.

19) Thereafter, the external management object 250 also ascertains that the particular event has occurred.

20) to 22) Then, the command for device management is executed in the same manner as in the processes 16) to 18) above.

23) When the command is performed, the DM scheduling enabler client 210 transmits data related to the particular event generated from the external management object 250 to the server 100.

The exemplary method for performing device management scheduling base on a trap mechanism has been described. It can be understood that the method can be implemented by software, hardware or a combination thereof. For example, the DM scheduling method can be stored in a storage medium (i.e., an internal memory of a mobile terminal, a Flash memory, a hard disk, etc.,) or can be implemented as codes or command language in a software program that can be executed by a processor (e.g., an internal microprocessor of the mobile terminal).

As so far described, the terminal, the server and the methods may have the following characteristics.

That is, when a particular event occurs, the command for device management is executed and the server can receive the required data, and thus the desired device management can be dynamically performed. In addition, one or more servers can request the terminal to execute one or more commands according to whether each different event occurs or not. Moreover, because the notification is performed only for the particular event, resources of the device (terminal) can be saved.

The present specification provides a terminal that comprises a first entity adapted to install, upon receipt from a server, a scheduling context, wherein the scheduling context comprises at least one of a first element which specifies information (or, a message) including at least one command for device management, and a second element which specifies a trap-based condition to execute the command; and a second entity adapted to execute the command in the information (or, message) specified by the first element, if a particular event specified by the second element occurs.

Also, the present specification provides a server that comprises a first entity adapted to generate a scheduling context and to request an installation of the scheduling context to a terminal, wherein the scheduling context comprises at least one of a first element which specifies information (or, a message) including at least one command for device management, and a second element which specifies a trap-based condition to execute the command; and a second entity adapted to receive a result obtained from executing the command from the terminal.

Also, the present specification provides a method for performing device management scheduled based on a trap mechanism, the method comprising: installing, upon receipt from a server, a scheduling context, wherein the scheduling context comprises at least one of a first element which specifies information (or, a message) including at least one command for device management, and a second element which specifies a trap-based condition to execute the command; and executing the command in the information (or, message) specified by the first element if an occurrence of a particular event specified by the second element is found.

It should be noted that the features and concepts described herein are related to various types of standards with respect to device management (DM) that are governed by certain corresponding standards organizations. As such, various corresponding standards and/or the concepts specified therein are also part of this disclosure.

For example, certain aspects described herein are related particular standards (such as, OMA, GSM, 3GPP, 3GPP2, IEEE, etc.). As such, at least some of the features described herein are applicable to such standards that have been developed or that are continuing to evolve.

Although this specification specifies various names of commands, nodes, sub-nodes, etc. related to device management (DM), it can be clearly understood that such names and labels are merely exemplary. The features of the present invention are not meant to be so limiting, as other equivalent names or labels may be used, as long as they refer to the same or equivalent functions and/or features.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal, comprising:
   a network interface; and
   a processor configured to install into the terminal a schedule context in a form of a tree, upon receipt from a server, using a device management protocol,
   wherein the schedule context comprises at least one command for device management, and condition information,
   wherein the scheduling context further comprises a valid element for specifying a period in which the scheduling context is valid, and a server node for representing an owner of the scheduling context,
   wherein before installing, validity of the scheduling context is verified,
   wherein the condition information includes a trap element including an identifier specifying a particular event generated in the terminal,
   wherein the condition information further includes a time element specifying a time trigger to execute the at least one command,
   wherein the time element comprises a base element which specifies a time to execute the at least one command,
   wherein the time element further comprises a recurrence rule element which specifies a recurrence rule of the time trigger, and
   wherein the processor is further configured to execute the at least one command according to the condition information when the particular event specified by the identifier occurs or when the time trigger occurs.

2. The terminal of claim 1, wherein the processor is further configured to:
   execute the at least one command,
   determine whether to report a result from executing the at least one command to the server, and
   report at least one of the result determined to be reported and a state of the scheduling context.

3. A method for performing device management scheduled based on a trap mechanism, the method comprising:
   installing in a terminal a schedule context in a form of a tree, upon receipt from a server using a device management protocol, the schedule context comprising at least one command for device management, and condition information,
   wherein the scheduling context further comprises a valid element for specifying a period in which the scheduling context is valid, and a server node for representing an owner of the scheduling context,
   wherein before installing, validity of the scheduling context is verified,
   wherein the condition information includes a trap element including an identifier specifying a particular event generated in the terminal,
   wherein the condition information further includes a time element specifying a time trigger to execute the at least one command,
   wherein the time element comprises a base element which specifies a time to execute the at least one command, and
   wherein the time element further comprises a recurrence rule element which specifies a recurrence rule of the time trigger; and
   executing, by the terminal, the at least one command according to the condition information when the particular event specified by the identifier occurs or when the time trigger Occurs.

* * * * *